ns [19]

| [11] | Patent Number: | 5,053,373 |
|---|---|---|
| [45] | Date of Patent: | Oct. 1, 1991 |

[54] ZEOLITE SSZ-32

[75] Inventor: Stacey I. Zones, San Francisco, Calif.

[73] Assignee: Chevron Research Company, San Francisco, Calif.

[21] Appl. No.: 433,382

[22] Filed: Oct. 24, 1989

Related U.S. Application Data

[63] Continuation of Ser. No. 172,730, Mar. 23, 1988, abandoned.

[51] Int. Cl.$^5$ .......................... B01J 29/06; B01J 29/14
[52] U.S. Cl. ......................................... 502/64; 502/65; 502/66; 423/328
[58] Field of Search .................. 502/60, 64, 71, 65, 502/66; 423/328, 329

[56] References Cited

U.S. PATENT DOCUMENTS

| 4,016,245 | 4/1977 | Plank et al. | 423/329 |
|---|---|---|---|
| 4,076,842 | 2/1978 | Plank et al. | 423/328 |
| 4,112,056 | 9/1978 | Chen et al. . | |
| 4,296,083 | 10/1981 | Rollmann | 502/77 |
| 4,371,457 | 2/1983 | Chu . | |
| 4,385,195 | 5/1983 | Butter et al. . | |
| 4,457,605 | 10/1984 | Kresge et al. . | |
| 4,477,582 | 10/1984 | Miale . | |
| 4,481,177 | 11/1984 | Valyocsik | 502/77 |
| 4,490,342 | 12/1984 | Valyocsik | 423/329 |
| 4,490,566 | 12/1984 | Chang et al. . | |
| 4,508,837 | 4/1985 | Zones | 502/77 |
| 4,510,256 | 4/1985 | Zones | 502/77 |
| 4,544,538 | 10/1985 | Zones | 258/111 |
| 4,559,314 | 12/1985 | Shihabi . | |
| 4,589,976 | 5/1986 | Zones | 258/111 |
| 4,610,854 | 9/1986 | Zones | 423/326 |
| 4,619,820 | 10/1986 | Valyocsik | 502/77 |
| 4,683,214 | 7/1987 | Angevine et al. . | |
| 4,687,654 | 8/1987 | Taramasso et al. | 502/60 |
| 4,788,169 | 11/1988 | Degman, Jr. et al. . | |
| 4,814,543 | 3/1989 | Chen et al. . | |
| 4,851,604 | 7/1989 | Absil et al. . | |
| 4,868,146 | 9/1989 | Chu et al. . | |
| 4,870,038 | 9/1989 | Page et al. . | |

FOREIGN PATENT DOCUMENTS 40016 11/1981 European Pat. Off. .

OTHER PUBLICATIONS

Sand et al., Zeolites, p. 183 (1983).
Ernst et al., ACS Symposium Series, 398, Chapter 38, pp. 560 et seq., Occelli et al., Editor (1989).
Parker et al., Zeolites, 3 (Jan. 1983).
Suzuki et al., Zeolites, 6, pp. 290 et seq. (1986).
Meler et al., Atlas of Zeolite Structure Types, p. 106 (1987).
Sieber et al., Helv. Chim. Acta vol. 57, p. 1533 et seq. (1974).

Primary Examiner—Anthony McFarlane
Attorney, Agent, or Firm—Burns, Doane, Swecker & Mathis

[57] ABSTRACT

A crystalline zeolite SSZ-32 of novel composition is prepared using an N-lower alkyl-N'-isopropyl-imidazolium cation as a template. Also disclosed is a process for converting hydrocarbons with crystalline zeolite SSZ-32.

13 Claims, No Drawings

ZEOLITE SSZ-32

This application is a continuation of application Ser. No. 07/172,730, filed Mar. 23, 1988, now abandoned.

BACKGROUND OF THE INVENTION

Natural and synthetic zeolitic crystalline aluminosilicates are useful as catalysts and adsorbents. These aluminosilicates have distinct crystal structures which are demonstrated by X-ray diffraction. The crystal structure defines cavities and pores which are characteristic of the different species. The adsorptive and catalytic properties of each crystalline aluminosilicate are determined in part by the dimensions of its pores and cavities. Thus, the utility of a particular zeolite in a particular application depends at least partly on its crystal structure.

Because of their unique molecular sieving characteristics, as well as their catalytic properties, crystalline aluminosilicates are especially useful in such applications as gas drying and separation and hydrocarbon conversion. Although many different crystalline aluminosilicates and silicates have been disclosed, there is a continuing need for new zeolites and silicates with desirable properties for gas separation and drying, hydrocarbon and chemical conversions, and other applications.

Crystalline aluminosilicates are usually prepared from aqueous reaction mixtures containing alkali or alkaline earth metal oxides, silica, and alumina. "Nitrogenous zeolites" have been prepared from reaction mixtures containing an organic templating agent, usually a nitrogen-containing organic cation. By varying the synthesis conditions and the composition of the reaction mixture, different zeolites can be formed using the same templating agent. Use of N,N,N-trimethyl cyclopentylammonium iodide in the preparation of Zeolite SSZ-15 molecular sieve is disclosed in U.S. Pat. No. 4,610,854; use of 1-azoniaspiro [4.4] nonyl bromide and N,N,N-trimethyl neopentylammonium iodide in the preparation of a molecular sieve termed "Losod" is disclosed in Helv. Chim. Acta (1974), Vol. 57, page 1533 (W. Sieber and W. M. Meier); use of quinuclidinium compounds to prepare a zeolite termed "NU-3" is disclosed in European Patent Publication No. 40016; use of 1,4-di(1-azoniabicyclo [2.2.2.]octane) lower alkyl compounds in the preparation of Zeolite SSZ-16 molecular sieve is disclosed in U.S. Pat. No. 4,508,837; use of N,N,N-trialkyl-1-adamantamine in the preparation of zeolite SSZ-13 molecular sieve is disclosed in U.S. Pat. No. 4,544,538. The preparation of crystalline aluminosilicates using an imidazole template is disclosed in U.S. Pat. No. 4,483,835.

SUMMARY OF THE INVENTION

We have prepared a family of crystalline aluminosilicate molecular sieves with unique properties, referred to herein as "Zeolite SSZ-32" of novel composition, and have found a highly effective method for preparing SSZ-32. Such novel SSZ-32 has a mole ratio of silicon oxide to aluminum oxide in the range of 20 to less than 40, and has the X-ray diffraction lines of Table 1 below. Novel zeolite SSZ-32 has essentially the same X-ray diffraction pattern as ZSM-23, described in U.S. Pat. No. 4,076,842. In the present invention the aluminum content is higher than previously described. The X-ray diffraction lines are quite broad due to the very small crystal size.

As has been shown before, aluminum can be a crystallization inhibitor during the synthesis of pentasil zeolites. Sand and co-workers have shown that crystallization rates for ZSM-5 are lowered by increasing aluminum content (Zeolites 1983 pg. 155). For some pentasil zeolites sufficient quantities of aluminum prevent crystallization entirely, establishing a lower boundary for $SiO_2/Al_2O_3$ values. In other instances, a different zeolite is obtained at a certain $SiO_2/Al_2O_3$ ratio. In the case of the system cited above for ZSM-23, a lower $SiO_2/Al_2O_3$ is established wherein the ratio is equal to or greater than 40. Attempts to obtain ZSM-23 having a lower $SiO_2/Al_2O_3$ resulted in the formation of ZSM-35, a synthetic ferrierite (U.S. Pat. No. 4,016,245, Ex. 18-25).

The product of the present invention is found to be substantially more selective than previously described ZSM-23 zeolites which possess higher $SiO_2/Al_2O_3$ values and larger crystals. This leads to novel, beneficial catalytic uses for SSZ-32. The novel zeolite SSZ-32 further has a composition, as synthesized and in the anhydrous state, in terms of mole ratios of oxides as follows: (0.05 to 2.0)$Q_2O$:(0.1 to 2.0)$M_2O$:$Al_2O_3$:(20 to less than 40)$SiO_2$ wherein M is an alkali metal cation, and Q is an N-lower alkyl-N'-isopropyl-imidazolium cation and preferably an N,N'-diisopropyl-imidazolium cation, or N-methyl-N'-isopropyl-imidazolium cation. The zeolite can have a $YO_2:W_2O_3$ mole ratio in the range of 20 to less than 40 (ZSM-23 as made has values $\geq 40$). As prepared, the silica:alumina mole ratio is typically in the range of 25:1 to about 37:1. Higher mole ratios can be obtained by treating the zeolite with chelating agents or acids to extract aluminum from the zeolite lattice. The silica:alumina mole ratio can also be increased by using silicon and carbon halides and other similar compounds.

Our invention also involves a method for preparing those zeolites, comprising preparing an aqueous mixture containing sources of N-lower alkyl-N'-isopropylimidazolium cation and preferably N,N'-diisopropylimidazolium or N-methyl-N'-isopropylimidazolium, an oxide to aluminum, and an oxide of silicon, and having a composition, in terms of mole ratios of oxides, falling within the following ranges: $SiO_2/Al_2O_3$, 20:1 to less than 40:1; and $Q/SiO_2$, 0.05:1 to 0.50:1, and Q is N-lower alkyl-N'-isopropyl-imidazolium cation and preferably N,N'-diisopropyl-imidazolium cation or N-methyl-N'-isopropyl-imidazolium cation; maintaining the mixture at a temperature of at least 100° C. until the crystals of said zeolite are formed; and recovering said crystals.

Preferably, the aluminum oxide source provides aluminum oxide which is in a covalently dispersed form on silica, i.e., the aluminum atoms are covalently bonded through oxygen atoms to silicon. The preferred aluminum oxide source seems to slow down the formation of other zeolite-type impurities.

DETAILED DESCRIPTION OF THE INVENTION

Novel SSZ-32 zeolites, as synthesized, have a crystalline structure whose X-ray powder diffraction pattern shows the following characteristic lines:

TABLE 1

| d/n | Int. I/I$_o$ |
|---|---|
| 11.05 | 26 |
| 10.05 | 10 |
| 7.83 | 17 |
| 4.545 | 71 |
| 4.277 | 71 |
| 3.915 | 100 |
| 3.726 | 98 |

The X-ray powder diffraction patterns were determined by standard techniques. The radiation was the K-alpha/doublet of copper and a scintillation counter spectrometer with a strip-chart pen recorder was used. The peak heights I and the positions, as a function of $2\theta$ where $\theta$ is the Bragg angle, were read from the spectrometer chart. From these measured values, the relative intensities, $100I/I_o$, where $I_o$ is the intensity of the strongest line or peak, and d, the interplanar spacing in Angstroms corresponding to the recorded lines, can be calculated. The X-ray diffraction pattern of Table 1 is characteristic of novel SSZ-32 zeolites. The zeolite produced by exchanging the metal or other cations present in the zeolite with various other cations yields substantially the same diffraction pattern although there can be minor shifts in interplanar spacing and minor variations in relative intensity. Minor variations in the diffraction pattern can also result from variations in the organic compound used in the preparation and from variations in the silica-to-alumina mole ratio from sample to sample. Calcination can also cause minor shifts in the X-ray diffraction pattern. Notwithstanding these minor perturbations, the basic crystal lattice structure remains unchanged.

Novel SSZ-32 zeolites can be suitably prepared from an aqueous solution containing sources of an alkali metal oxide, N-lower alkyl-N'-isopropyl-imidazolium cation and preferably N,N'-diisopropyl-imidazolium cation or N-methyl-N'-isopropyl-imidazolium cation, an oxide of aluminum, and preferably wherein the aluminum oxide source provides aluminum oxide which is in a covalently dispersed form on silica, and an oxide of silicon. The reaction mixture should have a composition in terms of mole ratios falling within the following ranges:

| | Broad | Preferred |
|---|---|---|
| SiO$_2$/Al$_2$O$_3$ | 20–less than 40 | 30–35 |
| OH$^-$/SiO$_2$ | 0.10–1.0 | 0.20–0.40 |
| Q/SiO$_2$ | 0.05–0.50 | 0.10–0.20 |
| M$^+$/SiO$_2$ | 0.05–0.30 | 0.15–0.30 |
| H$_2$O/SiO$_2$ | 20–300 | 25–60 |
| Q/Q + M$^+$ | 0.25–0.75 | 0.33–0.67 | wherein Q is an N-lower alkyl-N'-isopropyl-imidazolium cation and preferably an N,N'-diisopropyl-imidazolium cation or N-methyl-N'-isopropyl-imidazolium cation. M is an alkali metal ion, preferably sodium or potassium. The organic cation compound which acts as a source of the quaternary ammonium ion employed can provide hydroxide ion.

The cation component Q, of the crystallization mixture, is preferably derived from a compound of the formula

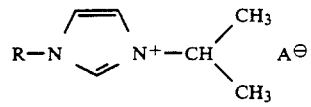

wherein R is lower alkyl containing 1 to 5 carbon atoms and preferably CH$_3$, or

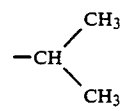

and A$^\ominus$ is an anion which is not detrimental to the formation of the zeolite. Representative of the anions include halogens, e.g., fluoride, chloride, bromide and iodide, hydroxide, acetate, sulfate, carboxylate, etc. Hydroxide is the most preferred anion.

The reaction mixture is prepared using standard zeolitic preparation techniques. Typical sources of aluminum oxide for the reaction mixture include aluminates, alumina, and aluminum compounds, such as aluminum-coated silica colloids, Al$_2$(SO$_4$)$_3$, and other zeolites.

In a preferred method of preparing zeolite SSZ-32, we have found that providing sources of aluminum oxide to a zeolite synthesis mixture wherein the aluminum oxide is in a covalently dispersed form on silica allows zeolites with increased aluminum content to be crystallized. In one preferred approach zeolites of pentasil structure and lower SiO$_2$/Al$_2$O$_3$ values (approximately 10) can be used as aluminum oxide sources or feedstocks for the synthesis of zeolite SSZ-32. These zeolites are recrystallized to the new SSZ-32 zeolite in the presence of the cation component Q defined above. Mordenite and ferrierite zeolites constitute two such useful sources of aluminum oxide or feedstocks. These latter zeolites have also been used in the crystallization of ZSM-5 and ZSM-11 (U.S. Pat. No. 4,503,024). In another preferred approach wherein the aluminum oxide is in a covalently dispersed form on silica is to use an alumina coated silica sol such as that manufactured by Nalco Chem. Co. under the product name 1SJ612 (26% SiO$_2$, 4% Al$_2$O$_3$). This sol is particularly useful in producing very small crystals with high catalytic activity. In addition to providing novel SSZ-32 with high aluminum content, use of the sol generates crystallites of less than 1000 Å (along the principal axis) with surprisingly high shape selectivity.

Indeed, the catalytic performance of SSZ-32, in the hydrogen form, is such that high conversions can be obtained while the shape selectivity is manifested by Constraint Index values (as defined in J. Catalysis 67, page 218) of 13 or greater and preferably from 13 to 16. Determination of Constraint index is also disclosed in U.S. Pat. No. 4,481,177. In general, lowering the crystallite size of a zeolite may lead to decreased shape selectivity. This has been demonstrated for ZSM-5 reactions involving aromatics as shown in J. Catalysis 99,327 (1986). In addition, a zeolite ZSM-22, (U.S. Pat. No. 4,481,177) has been found to be closely related to ZSM-23 (J. Chem. Soc. Chem. Comm. 1985 page 1117). In the above reference on ZSM-22 it was shown that ball-milling the crystallites produced a catalyst with a constraint index of 2.6. This is a surprisingly low value for this material given other studies which indicate that it is a very selective 10-ring pentasil (Proc. of 7th Intl.

Zeolite Conf. Tokyo, 1986, page 23). Presumably the ballmilling leads to a less selective but more active catalyst, by virtue of producing smaller crystallites.

In this regard it is quite surprising to find that novel zeolite SSZ-32 shows such high shape selectivity, given its high catalytic activity and very small crystallite size.

Typical sources of silicon oxide include silicates, silica hydrogel, silicic acid, colloidal silica, fumed silicas, tetraalkyl orthosilicates, and silica hydroxides. Salts, particularly alkali metal halides such as sodium chloride, can be added to or formed in the reaction mixture. They are disclosed in the literature as aiding the crystallization of zeolites while preventing silica occlusion in the lattice.

The reaction mixture is maintained at an elevated temperature until the crystals of the zeolite are formed. The temperatures during the hydrothermal crystallization step are typically maintained from about 140° C. to about 200° C., preferably from about 160° C. to about 180° C. and most preferably from about 170° C. to about 180° C. The crystallization period is typically greater than 1 day and preferably from about 5 days to about 10 days.

The hydrothermal crystallization is conducted under pressure and usually in an autoclave so that the reaction mixture is subject to autogenous pressure. The reaction mixture can be stirred during crystallization.

Once the zeolite crystals have formed, the solid product is separated from the reaction mixture by standard mechanical separation techniques such as filtration. The crystals are water-washed and then dried, e.g., at 90° C. to 150° C. for from 8 to 24 hours, to obtain the as synthesized, zeolite crystals. The drying step can be performed at atmospheric or subatmospheric pressures.

During the hydrothermal crystallization step, the crystals can be allowed to nucleate spontaneously from the reaction mixture. The reaction mixture can also be seeded with SSZ-32 or ZSM-23 crystals both to direct, and accelerate the crystallization, as well as to minimize the formation of undesired aluminosilicate contaminants. If the reaction mixture is seeded with crystals, the concentration of the organic compound can be reduced, but it is preferred to have some organic compound present, e.g., an alcohol.

The synthetic zeolites can be used as synthesized or can be thermally treated (calcined). Usually, it is desirable to remove the alkali metal cation by ion exchange and replace it with hydrogen, ammonium, or any desired metal ion. The zeolite can be leached with chelating agents, e.g., EDTA or dilute acid solutions, to increase the silica:alumina mole ratio. The zeolite can also be steamed; steaming helps stabilize the crystalline lattice to attack from acids. The zeolite can be used in intimate combination with hydrogenating components, such as tungsten, vanadium, molybdenum, rhenium, nickel, cobalt, chromium, manganese, or a noble metal, such as palladium or platinum, for those applications in which a hydrogenation-dehydrogenation function is desired. Typical replacing cations can include metal cations, e.g., rare earth, Group IIA and Group VIII metals, as well as their mixtures. Of the replacing metallic cations, cations of metals such as rare earth, Mn, Ca, Mg, Zn, Cd, Pt, Pd, Ni, Co, Ti, Al, Sn, Fe and Co are particularly preferred.

The hydrogen, ammonium, and metal components can be exchanged into the zeolite. The zeolite can also be impregnated with the metals, or, the metals can be physically intimately admixed with the zeolite using standard methods known to the art. And, the metals can be occluded in the crystal lattice by having the desired metals present as ions in the reaction mixture from which the SSZ-32 zeolite is prepared.

Typical ion exchange techniques involve contacting the synthetic zeolite with a solution containing a salt of the desired replacing cation or cations. Although a wide variety of salts can be employed, chlorides and other halides, nitrates, and sulfates are particularly preferred. Representative ion exchange techniques are disclosed in a wide variety of patents including U.S. Nos. 3,140,249; 3,140,251; and 3,140,253. Ion exchange can take place either before or after the zeolite is calcined.

Following contact with the salt solution of the desired replacing cation, the zeolite is typically washed with water and dried at temperatures ranging from 65° C. to about 315° C. After washing, the zeolite can be calcined in air or inert gas at temperatures ranging from about 200° C. to 820° C. for periods of time ranging from 1 to 48 hours, or more, to produce a catalytically active product especially useful in hydrocarbon conversion processes.

Regardless of the cations present in the synthesized form of the zeolite, the spatial arrangement of the atoms which form the basic crystal lattice of the zeolite remains essentially unchanged. The exchange of cations has little, if any, effect on the zeolite lattice structures.

The aluminosilicate can be formed into a wide variety of physical shapes. Generally speaking, the zeolite can be in the form of a powder, a granule, or a molded product, such as extrudate having particle size sufficient to pass through a 2-mesh (Tyler) screen and be retained on a 400-mesh (Tyler) screen. In cases where the catalyst is molded, such as by extrusion with an organic binder, the aluminosilicate can be extruded before drying, or, dried or partially dried and then extruded. The zeolite can be composited with other materials resistant to the temperatures and other conditions employed in organic conversion processes. Such matrix materials include active and inactive materials and synthetic or naturally occurring zeolites as well as inorganic materials such as clays, silica and metal oxides. The latter may occur naturally or may be in the form of gelatinous precipitates, sols, or gels, including mixtures of silica and metal oxides. Use of an active material in conjunction with the synthetic zeolite, i.e., combined with it, tends to improve the conversion and selectivity of the catalyst in certain organic conversion processes. Inactive materials can suitably serve as diluents to control the amount of conversion in a given process so that products can be obtained economically without using other means for controlling the rate of reaction. Frequently, zeolite materials have been incorporated into naturally occurring clays, e.g., bentonite and kaolin. These materials, i.e., clays, oxides, etc., function, in part, as binders for the catalyst. It is desirable to provide a catalyst having good crush strength, because in petroleum refining the catalyst is often subjected to rough handling. This tends to break the catalyst down into powders which cause problems in processing.

Naturally occurring clays which can be composited with the synthetic zeolites of this invention include the montmorillonite and kaolin families, which families include the sub-bentonites and the kaolins commonly known as Dixie, McNamee, Georgia and Florida clays or others in which the main mineral constituent is halloysite, kaolinite, dickite, nacrite, or anauxite. Fibrous clays such as sepiolite and attapulgite can also be used as supports. Such clays can be used in the raw state as originally mined or can be initially subjected to calcination, acid treatment or chemical modification.

In addition to the foregoing materials, the SSZ-32 zeolites can be composited with porous matrix materials and mixtures of matrix materials such as silica, alumina, titania, magnesia, silica:alumina, silica-magnesia, silica-zirconia, silica-thoria, silica-beryllia, silica-titania, titania-zirconia as well as ternary compositions such as silica-alumina-thoria, silica-alumina-zirconia, silica-alumina-magnesia and silica-magnesia-zirconia. The matrix can be in the form of a cogel.

The SSZ-32 zeolites can also be composited with other zeolites such as synthetic and natural faujasites (e.g., X and Y), erionites, and mordenites. They can also be composited with purely synthetic zeolites such as those of the ZSM series. The combination of zeolites can also be composited in a porous inorganic matrix.

Novel SSZ-32 zeolites are useful in hydrocarbon conversion reactions. Hydrocarbon conversion reactions are chemical and catalytic processes in which carbon containing compounds are changed to different carbon containing compounds. Examples of hydrocarbon conversion reactions include catalytic cracking, hydrocracking, and olefin and aromatics formation reactions, including formation from oxygenates. The catalysts are useful in other petroleum refining and hydrocarbon conversion reactions such as isomerizing n-paraffins and naphthenes, polymerizing and oligomerizing olefinic or acetylenic compounds such as isobutylene and butene-1, reforming, alkylating, isomerizing polyalkyl substituted aromatics (e.g., meta xylene), and disproportionating aromatics (e.g., toluene) to provide mixtures of benzene, xylenes and higher methylbenzenes.

Novel SSZ-32 zeolites can be used in processing hydrocarbonaceous feedstocks. Hydrocarbonaceous feedstocks contain carbon compounds and can be from many different sources, such as virgin petroleum fractions, recycle petroleum fractions, shale oil, liquefied coal, tar sand oil, and, in general, can be any carbon containing fluid susceptible to zeolitic catalytic reactions. Depending on the type of processing the hydrocarbonaceous feed is to undergo, the feed can contain metal or be free of metals, it can also have high or low nitrogen or sulfur impurities. It can be appreciated, however, that in general processing will be more efficient (and the catalyst more active) the lower the metal, nitrogen, and sulfur content of the feedstock.

The conversion of hydrocarbonaceous feeds can take place in any convenient mode, for example, in fluidized bed, moving bed, or fixed bed reactors depending on the types of process desired. The formulation of the catalyst particles will vary depending on the conversion process and method of operation.

Other reactions which can be performed using the catalyst of this invention containing a metal, e.g., platinum, include hydrogenation-dehydrogenation reactions, denitrogenation and desulfurization reactions.

Novel SSZ-32 can be used in hydrocarbon conversion reactions with active or inactive supports, with organic or inorganic binders, and with and without added metals. These reactions are well known to the art, as are the reaction conditions.

SSZ-32 can be used to dewax hydrocarbonaceous feeds by selectively removing straight chain paraffins. The catalytic dewaxing conditions are dependent in large measure on the feed used and upon the desired pour point. Generally, the temperature will be between about 200° C. and about 475° C., preferably between about 250° C. and about 450° C. The pressure is typically between about 15 psig and about 3000 psig, preferably between about 200 psig and 3000 psig. The liquid hourly space velocity (LHSV) preferably will be from 0.1 to 20, preferably between about 0.2 and about 10.

Hydrogen is preferably present in the reaction zone during the catalytic dewaxing process. The hydrogen to feed ratio is typically between about 500 and about 30,000 SCF/bbl (standard cubic feet per barrel), preferably about 1000 to about 20,000 SCF/bbl. Generally, hydrogen will be separated from the product and recycled to the reaction zone. Typical feedstocks include light gas oil, heavy gas oils and reduced crudes boiling about 350° F.

The SSZ-32 hydrodewaxing catalyst may optionally contain a hydrogenation component of the type commonly employed in dewaxing catalysts. The hydrogenation component may be selected from the group of hydrogenation catalysts consisting of one or more metals of Group VIB and Group VIII, including the salts, complexes and solutions containing such metals. The preferred hydrogenation catalyst is at least one of the group of metals, salts and complexes selected from the group consisting of at least one of platinum, palladium, rhodium, iridium and mixtures thereof or at least one from the group consisting of nickel, molybdenum, cobalt, tungsten, titanium, chromium and mixtures thereof. Reference to the catalytically active metal or metals is intended to encompass such metal or metals in the elemental state or in some form such as an oxide, sulfide, halide, carboxylate and the like.

The hydrogenation component is present in an effective amount to provide an effective hydrodewaxing catalyst preferably in the range of from about 0.05 to 5% by weight.

SSZ-32 can be used to convert light straight run naphthas and similar mixtures to highly aromatic mixtures. Thus, normal and slightly branched chained hydrocarbons, preferably having a boiling range above about 40° C. and less than about 200° C., can be converted to products having a substantial higher octane aromatics content by contacting the hydrocarbon feed with the zeolite at a temperature in the range of from about 400° C. to 600° C., preferably 80° C.–550° C. at pressures ranging from atmospheric to 10 bar, and liquid hourly space velocities (LHSV) ranging from 0.1 to 15.

The conversion catalyst preferably contains a Group VIII metal compound to have sufficient activity for commercial use. By Group VIII metal compound as used herein is meant the metal itself or a compound thereof. The Group VIII noble metals and their compounds, platinum, palladium, and iridium, or combinations thereof can be used. Rhenium or tin or a mixture thereof may also be used in conjunction with the Group III metal compound and preferably a noble metal compound.. The most preferred metal is platinum. The amount of Group VIII metal present in the conversion catalyst should be within the normal range of use in reforming catalysts, from about 0.05 to 2.0 weight percent, preferably 0.2 to 0.8 weight percent.

The zeolite/Group VIII metal conversion catalyst can be used without a binder or matrix. The preferred inorganic matrix, where one is used, is a silica-based binder such as Cab-O-Sil or Ludox. Other matrices such as magnesia and titania can be used. The preferred inorganic matrix is nonacidic.

It is critical to the selective production of aromatics in useful quantities that the conversion catalyst be substantially free of acidity, for example by poisoning the zeolite with a basic metal, e.g., alkali metal, compound. The zeolite is usually prepared from mixtures containing alkali metal hydroxides and thus have alkali metal contents of about 1-2 weight percent. These high levels of alkali metal, usually sodium or potassium, are unacceptable for most catalytic applications because they greatly deactivate the catalyst for cracking reactions. Usually, the alkali metal is removed to low levels by ion-exchange with hydrogen or ammonium ions. By alkali metal compound as used herein is meant elemental or ionic alkali metals or their basic compounds. Surprisingly, unless the zeolite itself is substantially free of acidity, the basic compound is required in the present process to direct the synthetic reactions to aromatics production.

The amount of alkali metal necessary to render the zeolite substantially free of acidity can be calculated using standard techniques based on the aluminum content of the zeolite. Under normal circumstances, the zeolite as prepared and without ion-exchange will contain sufficient alkali metal to neutralize the acidity of the catalyst. If a zeolite free of alkali metal is the starting material, alkali metal ions can be ion exchanged into the zeolite to substantially eliminate the acidity of the zeolite. An alkali metal content of about 100%, or greater, of the acid sites calculated on a molar basis is sufficient. Similar considerations are in order for alkaline earth cations.

Where the basic metal content is less than 100% of the acid sites on a molar basis, the test described in U.S. Pat. No. 4,347,394 which patent is incorporated totally herein by reference, can be used to determine if the zeolite is substantially free of acidity.

The preferred alkali metals are sodium and potassium. The zeolite itself can be substantially free of acidity only at very high silica:alumina mol ratios; by "zeolite consisting essentially of silica" is meant a zeolite which is substantially free of acidity without base poisoning.

Hydrocarbon cracking stocks can be catalytically cracked in the absence of hydrogen using SSZ-32 at liquid hourly space velocities from 0.5 to 50, temperatures from about 260° F. to 1625° F. and pressures from subatmospheric to several hundred atmospheres, typically from about atmospheric to about 5 atmospheres.

For this purpose, the SSZ-32 catalyst can be composited with mixtures of inorganic oxide supports as well as traditional cracking catalyst.

The catalyst may be employed in conjunction with traditional cracking catalysts, e.g., any aluminosilicate heretofore employed as a component in cracking catalysts. Representative of the zeolitic aluminosilicates disclosed heretofore as employable as component parts of cracking catalysts are Zeolite Y (including steam stabilized chemically modified, e.g., ultra-stable Y), Zeolite X, Zeolite beta (U.S. Pat. No. 3,308,069), Zeolite ZK-20 (U.S. Pat. No. 3,445,727), Zeolite ZSM-3 (U.S. Pat. No. 3,415,736), faujasite, LZ-10 (U.K. Patent 2,014,970, June 9, 1982), ZSM-5-type zeolites, e.g., ZSM-5, ZSM-11, ZSM-12, ZSM-23, ZSM-35, ZSM-38, ZSM-48, crystalline silicates such as silicalite (U.S. Pat. No. 4,061,724), erionite, mordenite, offretite, chabazite, FU-1-type zeolite, NU-type zeolites, LZ-210-type zeolite and mixtures thereof. Traditional cracking catalysts containing amounts of $Na_2O$ less than about one percent by weight are generally preferred. The relative amounts of the SSZ-32 component and traditional cracking component, if any, will depend at least in part, on the selected hydrocarbon feedstock and on the desired product distribution to be obtained therefrom, but in all instances an effective amount of SSZ-32 is employed. When a traditional cracking catalyst (TC) component is employed the relative weight ratio of the TC to the SSZ-32 is generally between about 1:10 and about 500:1, desirably between about 1:10 and about 200:1, preferably between about 1:2 and about 50:1, and most preferably is between about 1:1 and about 20:1.

The cracking catalysts are typically employed with an inorganic oxide matrix component which may be any of the inorganic oxide matrix components which have been employed heretofore in the formulation of FCC catalysts including: amorphous catalytic inorganic oxides, e.g., catalytically active silica-aluminas, clays, silicas, aluminas, silica-aluminas, silica-zirconias, silica-magnesias, alumina-borias, alumina-titanias and the like and mixtures thereof. The traditional cracking component and SSZ-32 may be mixed separately with the matrix component and then mixed or the TC component and SSZ-32 may be mixed and then formed with the matrix component.

The mixture of a traditional cracking catalyst and SSZ-32 may be carried out in any manner which results in the coincident presence of such in contact with the crude oil feedstock under catalytic cracking conditions. For example, a catalyst may be employed containing the traditional cracking catalyst and a SSZ-32 in single catalyst particles or SSZ-32 with or without a matrix component may be added as a discrete component to a traditional cracking catalyst.

SSZ-32 is especially useful as a catalyst in a process for isomerizing one or more xylene isomers in a $C_8$ aromatic feed to obtain ortho-, meta- and para-xylene in a ratio approaching the equilibrium value. In particular, xylene isomerization is used in conjunction with a separation process to manufacture para-xylene. For example, a portion of the para-xylene in a mixed $C_8$ aromatics stream may be recovered by crystallization and centrifugation. The mother liquor from the crystallizer is then reacted under xylene isomerization conditions to restore ortho-, meta-, and para-xylenes to a near equilibrium ratio. At the same time, part of the ethylbenzene in the mother liquor is converted to xylenes or to products which are easily separated by distillation. The isomerate is blended with fresh feed and the combined stream is distilled to removed heavy and light by-products. The resultant $C_8$ aromatics stream is then sent to the crystallizer to repeat the cycle.

Xylene isomerization catalysts are judged on their ability to produce a near equilibrium mixture of xylenes and convert ethylbenzene with very little net loss of xylenes. The SSZ-32 type zeolites are especially effective in this regard. Accordingly, an additional aspect of the present invention is to provide a hydrocarbon conversion process which comprises contacting a $C_8$ aromatic stream containing one or more xylene isomers or ethylbenzene or a mixture thereof, under isomerization conditions with a catalyst comprising SSZ-32.

The SSZ-32 may conveniently be used as an aggregate in the form of pellets or extrudates. An inorganic oxide binder such as gamma alumina or silica may be employed to provide attrition resistance.

In the vapor phase, suitable isomerization conditions include a temperature in the range 500°–1100° F., preferably 600°–1050° F., a pressure in the range 0.5–50 atm abs, preferably 1–5 atm abs, and a weight hourly space velocity (WHSV) of 0.1 to 100, preferably 0.5 to 50. Optionally, isomerization in the vapor phase is conducted in the presence of 3.0 to 30.0 moles of hydrogen per mole of alkylbenzene. If hydrogen is used the catalyst should comprise 0.1 to 2.0 wt % of a hydrogenation/dehydrogenation component selected from Group VIII of the Periodic Table, especially platinum, palladium or nickel. By Group VIII metal component is meant the metals and their compounds such as oxides and sulfides.

In the liquid phase, suitable isomerization conditions include a temperature in the range 100°–700° F., a pressure in the range 1–200 atm abs, and a WHSV in the range 0.5–50. Optionally, the isomerization feed may contain 10 to 90 wt % of a diluent such as toluene, trimethylbenzenes, naphthenes or paraffins.

SSZ-32 can also be used to oligomerize straight and branched chain olefins having from about 2 to 21 and preferably 2–5 carbon atoms. The oligomers which are the products of the process are medium to heavy olefins which are useful for both fuels, i.e., gasoline or a gasoline blending stock and chemicals.

The oligomerization process comprises contacting the olefin feedstock in the gaseous state phase with SSZ-32 at a temperature of from about 450° F. to about 1200° F., a WHSV of from about 0.2 to about 50 and a hydrocarbon partial pressure of from about 0.1 to about 50 atmospheres.

Also, temperatures below about 450° F. may be used to oligomerize the feedstock, when the feedstock is in the liquid phase when contacting the zeolite catalyst. Thus, when the olefin feedstock contacts the zeolite catalyst in the liquid phase, temperatures of from about 50° F. to about 450° F., and preferably from 80° to 400° F. may be used and a WHSV of from about 0.05 to 20 and preferably 0.1 to 10. It will be appreciated that the pressures employed must be sufficient to maintain the system in the liquid phase. As is known in the art, the pressure will be a function of the number of carbon atoms of the feed olefin and the temperature. Suitable pressures include from about 0 psig to about 3000 psig.

The zeolite can have the original cations associated therewith replaced by a wide variety of other cations according to techniques well known in the art. Typical cations would include hydrogen, ammonium and metal cations including mixtures of the same. Of the replacing metallic cations, particular preference is given to cations of metals such as rare earth metals, manganese, calcium, as well as metals of Group II of the Periodic Table, e.g., zinc, and Group VIII of the Periodic Table, e.g., nickel. One of the prime requisites is that the zeolite have a fairly low aromatization activity, i.e., in which the amount of aromatics produced is not more than about 20% by weight. This is accomplished by using a zeolite with controlled acid activity [alpha value] of from about 0.1 to about 120, preferably from about 0.1 to about 100, as measured by its ability to crack n-hexane.

Alpha value are defined by a standard test known in the art, e.g., as shown in U.S. Pat. No. 3,960,978 which is incorporated totally herein by reference. If required, such zeolites may be obtained by steaming, by use in a conversion process or by any other method which may occur to one skilled in this art.

SSZ-32 can be used to convert light gas $C_2$–$C_6$ paraffins and/or olefins to higher molecular weight hydrocaroons including aromatic compounds. Operating temperatures of 100° C.–700° C., operating pressures of 0 to 1000 psig and space velocities of 0.5–40 $hr^{-1}$ WHSV (weight hourly space velocity) can be used to convert the $C_2$–$C_6$ paraffin and/or olefins to aromatic compounds. Preferably, the zeolite will contain a catalyst metal or metal oxide wherein said metal is selected from the group consisting of Group IB, IIB, VIII and IIIA of the Periodic Table, and most preferably gallium or zinc and in the range of from about 0.05 to 5% by weight.

SSZ-32 can be used to condense lower aliphatic alcohols having 1 to 8 carbon atoms to a gasoline boiling point hydrocarbon product comprising mixed aliphatic and aromatic hydrocarbon. The condensation reaction proceeds at a temperature of about 500° F. to 1000° F., a pressure of about 0.5 to 1000 psig and a space velocity of about 0.5 to 50 WHSV. The process disclosed in U.S. Pat. No. 3,984,107 more specifically describes the process conditions used in this process, which patent is incorporated totally herein by reference.

The catalyst may be in the hydrogen form or may be base exchanged or impregnated to contain ammonium or a metal cation complement, preferably in the range of from about 0.05 to 5% by weight. The metal cations that may be present include any of the metals of the Groups I through VIII of the Periodic Table. However, in the case of Group IA metals the cation content should in no case be so large as to effectively inactivate the catalyst.

The product of this invention can also be used as an adsorbent, as a filler in paper, paint, and toothpastes, and as a water-softening agent in detergents.

The following are examples for the synthesis and characterization of novel zeolite SSZ-32 composition.

EXAMPLES

EXAMPLE 1

18.73 Grams of a 0.78M solution of N,N'-diisopropylimidazolium hydroxide were mixed with 44 ml of $H_2O$ and 1.06 gms of NaOH (solid). The organo-cation is prepared as described in U.S. Pat. No. 4,483,835. It is then ion-exchanged to its hydroxide form using AG1-X8 resin. 22.16 Grams of Ludox AS-30 are blended into the above solution. After thorough mixing, 10.96 gms of Nalco 1SJ612 (26% $SiO_2$, 4% $Al_2O_3$) were added with mixing. Finally, milligram quantities of crystalline ZSM-23, prepared as in Example 31 of U.S. Pat. No. 4,483,835, were added to the mix as seeds. The reaction solution was stirred at 30 RPM and heated to 170° C for 7 days. Upon washing, drying and X-ray diffraction analysis, the reaction product was crystalline SSZ-32.

EXAMPLE 2

Another reaction was run as in Example 1, adding in sequence, 0.24 gms of NaOH, 7 ml $H_2O$, 4.0 gms of the template solution of Example 1, 4.0 gms of Ludox AS-30, and 2.55 gms of Nalco 1SJ612. Seeds from Example 1 were added and the reaction was run as in Example 1. The product was once again crystalline SSZ-32. Analysis showed the $SiO_2/Al_2O_3$ ratio to be 39.

EXAMPLE 3

While the use of the colloidal silica with aluminum dispersed on it (Nalco 1SJ612) is helpful in obtaining SSZ-32 zeolite with enhanced Al$_2$O$_3$ content, other sources of aluminum can be used. A particularly interesting way to disperse aluminum is to use it already incorporated into a zeolite as feedstock. Thus, aluminum was supplied as Norton Ferrierite (SiO$_2$/Al$_2$O$_3$=10). 208 Grams of the hydroxide template from Example 1 was mixed with 0.93 grams of NaOH, and 13.2 grams of Ferrierite. 78 Grams of Ludox AS-30 were blended in and the reaction mixture was placed in a 600 cc reactor, stirred at 69 RPM, and heated for 8 days at 175° C. The product was crystalline SSZ-32 with no Ferrierite detected. Analysis showed the SiO$_2$/Al$_2$O$_3$ ratio to be 32.

EXAMPLE 4

A reaction similar to that in Example 3 was set up except the organocation used was N-methyl-N'-isopropylimidazolium as prepared in U.S. Pat. No. 4,483,835 and ion-exchanged to its hydroxide form. Synthesis at 160° C. and 30 RPM for 6 days produced SSZ-32 zeolite without Ferrierite as a secondary phase.

EXAMPLE 5

3.25 Grams of N,N'-diisopropyl-imidazolium hydroxide (0.80M), 0.26 gms of NaOH and 7.15 ml H$_2$O were combined. 0.55 Grams of Al$_2$(SO$_4$)$_3$.18H$_2$O was dissolved and finally 6.5 gms of Ludox AS-30 was blended in and a magnetic teflon-coated stir bar was placed in the teflon reactor with the reactants. The reactor was tumbled at 30 RPM while being heated to 170° C. for 10 days. The crystalline product after work-up and analysis was SSZ-32 with a trace of mordenite. The SiO$_2$/Al$_2$O$_3$ ratio of the solids was 35.

EXAMPLE 6

A reactant mixture was prepared from 33 gms of the template solution used in the previous example, 2.21 gms NaOH, 2.04 gms Na$_2$O Al$_2$O$_3$ 3H$_2$O, 64 ml H$_2$O, and finally 65 gms of Ludox AS-30. Seeds of ZSM-23 (0.5 gms) as prepared by the method of U.S. Pat. No. 4,483,835 were added. The reactant SiO$_2$/Al$_2$O$_3$ ratio was 35 and the synthesis was carried out at 170° C. for 7 days at 50 RPM. The product was SSZ-32 with a small amount of mordenite.

EXAMPLE 7

A solution is made up by mixing 3.79 gms of NaOH(solid), 122 ml H$_2$O, and 53 gms of a 15.5% solution of the N,N'-diisopropyl-imidazolium hydroxide. 65 Grams of Ludox AS-30 is added. After thorough mixing, aliquots of 16.36 gms of this solution are transferred to the teflon cups of Parr 4745 reactors. 2.74 Grams of Nalco 1SJ612 are added to each cup with stirring and the contents are heated at 170° C. for 6 days with 30 RPM tumbling. The product was identified as pure SSZ-32. ICP chemical analysis showed the product to have an SiO$_2$/Al$_2$O$_3$ ratio of 32.7. The representative X-ray diffraction pattern of the as made material is tabulated in Table 2 below.

TABLE 2

| 2θ | d/n | Int | 100 × I/I$_o$ |
|---|---|---|---|
| 8.00 | 11.05 | 15 | 26 |
| 8.80 | 10.05 | 6 | 10 |
| 11.30 | 7.83 | 10 | 17 |
| 14.50 | 6.11 | 1 | 2 |
| 15.75 | 5.63 | 3 | 5 |
| 16.50 | 5.37 | 3 | 5 |
| 18.10 | 4.901 | 7 | 12 |
| 19.53 | 4.545 | 41 | 71 |

TABLE 2-continued

| 2θ | d/n | Int | 100 × I/I$_o$ |
|---|---|---|---|
| 20.05 | 4.428 | 6 shoulder | 10 shoulder |
| 20.77 | 4.277 | 41 | 71 |
| 21.30 | 4.171 | 7 | 12 |
| 22.71 | 3.915 | 58 | 100 |
| 23.88 | 3.726 | 57 | 98 |
| 24.57 | 3.623 | 30 | 52 |
| 25.08 | 3.551 | 25 | 43 |
| 25.88 | 3.443 | 27 | 47 |
| 26.88 | 3.317 | 5 | 9 |
| 28.11 | 3.174 | 6 | 10 |

EXAMPLE 8

The zeolite products of Examples 1–7 were calcined as follows. In a thin bed, the zeolite was brought to 540° C. over a 7-hour period in a mixture of air and nitrogen. The calcination was maintained at 540° C. for hours and then raised to 600° C. and kept there for 4 more hours. If all carbonaceous material was still not removed, the temperature was brought to 650° C. for several hours. Each sample was then subjected to a sequence of 4 NH$_4$NO$_3$ ion-exchanges in a 1M solution, each for 2 hours at 100° C. Finally, the dried exchanged zeolite was calcined at 540° C. for several hours to produce the acidic form of the zeolite.

EXAMPLE 9

The hydrogen form of the SSZ-32 powder from Example 2 (treated according to Example 8) was placed in ¼" reactor tube and heated to 500° C. A 1/1 v/v n-hexane/3-methyl-pentane feed was passed over the catalyst at an LHSV of 1. At 10 minutes on stream and at 800° F. the conversion was found to be 48% with a constraint index of 14.2, thus demonstrating the novel shape selective properties of the SSZ-32 described herein.

EXAMPLE 10

The same catalytic evaluation carried out in Example 9 was repeated this time using the crystalline product of Example 7. The conversion was now 55% at 10 minutes on stream and the constraint index was 16.

EXAMPLE 11

The catalyst used in Example 10 was employed for conversion of methanol to hydrocarbons. At 10 minutes on stream the conversion was 100% at 700° F. with the products mainly distributed between C$_3$ to C$_8$ with olefins, saturates and aromatics having been formed.

EXAMPLE 12

A sample of zeolite H+SSZ-32 prepared according to Examples 7 and 8 was tested for xylene isomerization activity as follows. The pure zeolite powder was formed into pellets using a hydraulic press. The pellets were then crushed and sieved to obtain 20–40 mesh granules which were then calcined for four hours. One gram of the calcined material was then charged to a 3/16-inch I.D. tubular microreactor heated by an electric furnace. The catalyst bed was heated to 800° F. in flowing helium. The helium was then replaced with a mixed xylene feed. The feed composition and reactor effluent were analyzed by gas chromatography. Table 3 shows that the zeolite H+SSZ-32 produced a near equilibrium mixture of xylenes. Better than 30% ethylbenzene conversion was obtained with only a small net loss of xylenes.

TABLE 3

Xylene Isomerization Over Zeolite H+SSZ-32

|  | Feed | Products |
|---|---|---|
| Temperature, °F. |  | 800 |
| WHSV |  | 5 |
| Pressure, psig |  | 25 |
| Composition, Wt % |  |  |
| non-aromatics | 1.4 | 2.1 |
| benzene | 0.0 | 2.2 |
| toluene | 1.3 | 2.9 |
| ethylbenzene | 9.7 | 6.7 |
| p-xylene | 9.5 | 19.6 |
| m-xylene | 53.1 | 43.3 |
| o-xylene | 22.9 | 19.7 |
| heavy aromatics | 2.1 | 3.7 |
| Percent EB Conversion |  | 30.9 |
| Percent Xylene Loss |  | 3.3 |
| p-xylene % approach to equilibrium |  | 102 |

EXAMPLE 13

SSZ-32 powder from Examples 7 and 8, and treated according to Example 8, was ion-exchanged with palladium as follows.

Four (4) grams of the product of Example 7 following Example 8 treatment was slurried into 43 ml $H_2O$ and the pH was brought to 9.5 with $NH_4OH$. 0.069 Grams of $Pd(NH_3)_4 \cdot 2NO_3$ in 6 ml. $H_2O$ with pH adjusted to 9.5 also ($NH_4OH$) was added slowly and stirred overnight at room temperature. The solids are then filtered, washed, and dried.

The ion-exchanged powder was formed into tablets which were crushed and sieved to obtain 20-40 mesh granules for testing in a microreactor. The granular catalyst was activated by calcination in air at 250° F. to 900° F. over a period of eight hours followed by reduction of the palladium in flowing hydrogen at 900° F. The catalyst was tested as described in the previous example except that the xylene isomerization process was carried out at 150 psig in the presence of hydrogen.

The reaction conditions and results are shown in Table 4. As in the previous example, SSZ-32 was shown to produce an equilibrium mixture of xylenes with only a small net xylene loss at better than 30% ethylbenzene conversion. The presence of hydrogen and a hydrogenation catalyst (i.e., Pd) was found to inhibit catalyst fouling and greatly increase run length compared to the previous example.

TABLE 4

Xylene Isomerization Over Palladium Ion-Exchanged SSZ-32

|  | Feed | Products |
|---|---|---|
| Temperature, °F. |  | 800 |
| WHSV of xylene feed |  | 5 |
| Pressure, psig |  | 150 |
| $H_2$/xylene molar ratio |  | 10 |
| Composition, Wt % |  |  |
| Non-aromatics | 1.4 | 2.7 |
| Benzene | 0.0 | 2.1 |
| Toluene | 1.3 | 2.9 |
| Ethylbenzene | 9.7 | 6.4 |
| P-xylene | 9.5 | 19.6 |
| M-xylene | 53.1 | 43.4 |
| O-xylene | 22.9 | 19.5 |
| Heavy aromatics | 2.1 | 3.4 |
| Percent EB Conversion |  | 32.6 |
| Percent Xylene Loss |  | 3.5 |
| P-xylene % approach to equilibrium |  | 102 |

What is claimed is:

1. A zeolite having a mole ratio of silicon oxide to aluminum oxide greater than about 20:1 to less than 40:1, having a constraint index after calcination and in the hydrogen form of 13 or greater, and having the X-ray diffraction lines of Table 1.

2. A zeolite having a composition, as synthesized and in the anhydrous state, in terms of mole ratios of oxides as follows: (0.05 to 2.0)$Q_2O$:(0.1 to 2.0)$M_2O$: $Al_2O_3$:(20 to less than 40) $SiO_2$ wherein M is an alkali metal cation, Q is an N-($C_{1-5}$) lower alkyl-N'-isopropyl-imidazolium cation, said zeolite having a constraint index after calcination and in the hydrogen form of 13 or greater and having the X-ray diffraction lines of Table 1.

3. The zeolite according to claim 2 wherein Q is an N-methyl-N'-isopropyl-imidazolium cation.

4. The zeolite according to claim 2 wherein Q is an N,N'-diisopropyl-imidazolium cation.

5. A zeolite prepared by thermally treating the zeolite of claim 2 at a temperature from about 200° C. to 820° C.

6. The zeolite according to claim 1, or 2 wherein said mole ratio of silicon oxide to aluminum oxide is abort 25:1 to less than 37:1.

7. A zeolite according to claim 1, 2 or 5 which has undergone ion exchange with hydrogen, ammonium, rare earth metal, Group IIA metal, or Group VIII metal ions.

8. A zeolite according to claim 1, 2 or 5 wherein rare earth metals, Group IIA metals, or Group VIII metals are occluded in the zeolite.

9. A zeolite composition, comprising the zeolite of claim 1, 2 or 5 and an inorganic matrix.

10. A method for preparing a zeolite having a mole ratio of silicon oxide to aluminum oxide greater than about 20:1 to less than 40:1, and having the X-ray diffraction lines of Table 1 which method comprises:
    (a) preparing an aqueous mixture containing sources of an alkali metal oxide, an N-lower alkyl-N'-isopropyl-imidazolium cation, an oxide of aluminum, and an oxide of silicon;
    (b) maintaining the mixture at a temperature of at least 140° C. until the crystals of said zeolite form; and
    (c) recovering said crystals.

11. The method according to claim 10 wherein the aqueous mixture has a composition in terms of mole ratios of oxides falling in the ranges: $SiO_2/Al_2O_3$, 20:1 to less than 40:1; $Q/SiO_2$, 0.05:1 to 0.50:1, and Q is an N-lower alkyl-N'-isopropyl-imidazolium cation.

12. The method according to claim 10 or 11 wherein the N-lower alkyl-N'-isopropyl-imidazolium cation is selected from the group consisting of N-methyl-N'-isopropyl-imidazolium or N,N'-diisopropyl-imidazolium cation.

13. The method according to claim 10 wherein said aluminum oxide source provides aluminum oxide which is in a covalently dispersed form on silica.

* * * * *